United States Patent
Dreyer

(10) Patent No.: US 7,476,056 B2
(45) Date of Patent: Jan. 13, 2009

(54) SOUND ATTENUATING SLEEVE FOR USE ON A PILING

(75) Inventor: Harold B. Dreyer, Anchorage, AK (US)

(73) Assignee: Gunderboom, Inc., Anchorage, AK (US)

( * ) Notice: Subject to any disclaimer, the term of this patent is extended or adjusted under 35 U.S.C. 154(b) by 17 days.

(21) Appl. No.: 11/767,136

(22) Filed: Jun. 22, 2007

(65) Prior Publication Data

US 2008/0006478 A1  Jan. 10, 2008

Related U.S. Application Data

(60) Provisional application No. 60/805,542, filed on Jun. 22, 2006.

(51) Int. Cl.
*E02D 7/02* (2006.01)

(52) U.S. Cl. ..................... 405/228; 405/211
(58) Field of Classification Search ................ 405/228, 405/211
See application file for complete search history.

(56) References Cited

U.S. PATENT DOCUMENTS

| | | | | |
|---|---|---|---|---|
| 2,122,517 | A | * | 7/1938 | Curtis ........................ 175/135 |
| 3,975,918 | A | * | 8/1976 | Jansz ........................ 405/232 |
| 6,485,229 | B1 | | 11/2002 | Gunderson et al. |
| 6,567,341 | B2 | | 5/2003 | Dreyer et al. |

* cited by examiner

*Primary Examiner*—John Kreck
(74) *Attorney, Agent, or Firm*—Nixon Peabody LLP

(57) ABSTRACT

Disclosed are a sound attenuation sleeve for use on a piling during underwater construction and a method of using such a sleeve for attenuating underwater transmission of sound and/or shock waves during underwater pile driving operations.

25 Claims, 7 Drawing Sheets

SOUND ATTENUATING SLEEVE FOR USE ON A PILING

This application claims the priority benefit of provisional U.S. Patent Application Ser. No. 60/805,542, filed Jun. 22, 2006, which is hereby incorporated by reference in its entirety.

FIELD OF THE INVENTION

The present invention relates to a sound attenuation sleeve for use on a piling during underwater construction and a method of using such for attenuating underwater transmission of sound and/or shock waves during underwater pile driving operations.

BACKGROUND OF THE INVENTION

Underwater explosives as well as construction and demolition work, in general, produce sound or shock waves that travel in all directions from the site of activity at a rate of approximately four times the speed it would travel in air. Water is also non-compressible, whereas air is compressible. Thus, water more effectively transmits the energy of the sound or shock wave to the surrounding environments. As a result, underwater explosions or construction or demolition work quite often lead to severe injury or death of large numbers of marine life as a result of the crushing effect the sound or shock waves have on internal air cavities of the marine life. Generally speaking, regulatory agencies require some means for minimizing the impact of sound generated by underwater detonations or construction or demolition work.

One approach that has been utilized previously involves the provision of an air curtain, which is simply the result of releasing compressed air below the water surface such that the rising air bubbles form a semi-continuous perimeter about the site of work. The presence of the air bubbles about the perimeter have the effect of dispersing the sound or shock waves produced by the worksite, thereby absorbing the intensity of the sound or shock wave and allowing the transmission of, hopefully, only non-lethal sound or shock waves whose intensity is greatly dissipated as compared to the initial sound or shock waves emanating from the site of work. One problem with this approach is that the air curtain is often dispersed by water flow such as from tidal currents, thereby decreasing its efficacy. Depending on how great the air curtain becomes dispersed, it may have little or no effect.

Other approaches have been described in U.S. Pat. No. 6,485,229 to Gunderson et al. and U.S. Pat. No. 6,567,341 to Dreyer et al. Both of these patents describe a larger boom system that is designed to be installed in a body of water so that the boom system surrounds a site of underwater construction or demolition. Both utilize a boom curtain that includes at least two sheets of fabric material, and a gas injection system that introduces pressurized gas through an outlet positioned between the sheets of fabric material. While these systems have proven effective in attenuating sound or shock waves, due to their size the systems require time consuming set up and significant expense in materials and fabrication.

It would be desirable, therefore, to develop a device that overcomes the above-noted deficiencies of prior art sound/shock-wave attenuation systems.

The present invention is intended to overcome these and other deficiencies in the art.

SUMMARY OF THE INVENTION

A first aspect of the present invention relates to a sound attenuation sleeve for use on a piling during underwater construction. The sound attenuation sleeve includes: at least two layers of fabric joined together; at least one hose positioned between the at least two layers of fabric; and first and second connectors secured to the at least two layers of fabric such that upon wrapping the sleeve about a piling, the first and second connectors are positioned for mating engagement.

A second aspect of the present invention relates to a sound attenuation sleeve according to the first aspect of the invention, where the sleeve also includes a source of compressed gas coupled in fluid communication with the at least one hose.

A third aspect of the present invention relates to a sound attenuation sleeve according to the second aspect of the invention, where the sleeve also includes a plurality of hollow structures positioned between the at least two layers of fabric, each of the hollow structures being filled with a gas.

A fourth aspect of the present invention relates to a sound attenuation sleeve for use on a piling during underwater construction. The sound attenuation sleeve includes: at least two layers of fabric joined together; a plurality of hollow structures positioned between the at least two layers of fabric, each of the hollow structures being filled with a gas; and first and second connectors secured to the at least two layers of fabric such that upon wrapping the sleeve about a piling, the first and second connectors are positioned for mating engagement.

A fifth aspect of the present invention relates to a method of attenuating underwater transmission of sound and/or shock waves during underwater pile driving operations. The method involves surrounding a pile to be driven with a sleeve according to the first, second, or third aspects of the present invention, wherein the first and second connectors are matingly engaged; introducing a compressed gas into the at least one hose; and driving the underwater pile during said introducing, whereby gas present within the hollow structures, present within the at least one hose, and/or optionally released from the at least one hose attenuates sound and/or shock waves produced during said driving.

A sixth aspect of the present invention relates to a method of attenuating underwater transmission of sound and/or shock waves during underwater pile driving operations. The method involves surrounding a pile to be driven with a sleeve according to the fourth aspect of the present invention, wherein the first and second connectors are matingly engaged; and driving the underwater pile, whereby gas present within the hollow structures attenuates sound and/or shock waves produced during said driving.

The sleeve, by virtue of its size and design, is simpler to install and less expensive to manufacture than whole boom systems described in the prior art. Moreover, the sleeve can be designed to have both the traditional bubble curtain (emitted from diffusers, if present) as well as an arrangement of the inflated hoses that substantially surround a pile. The presence of hollow structures retained between the fabric materials that form much of the sleeve structure is particularly effective at attenuating harmful sound and/or shock waves. These combinations can be designed to reduce different harmful frequencies of sound and/or shock waves produced during the pile driving operation.

DETAILED DESCRIPTION OF THE INVENTION

Figure 1:
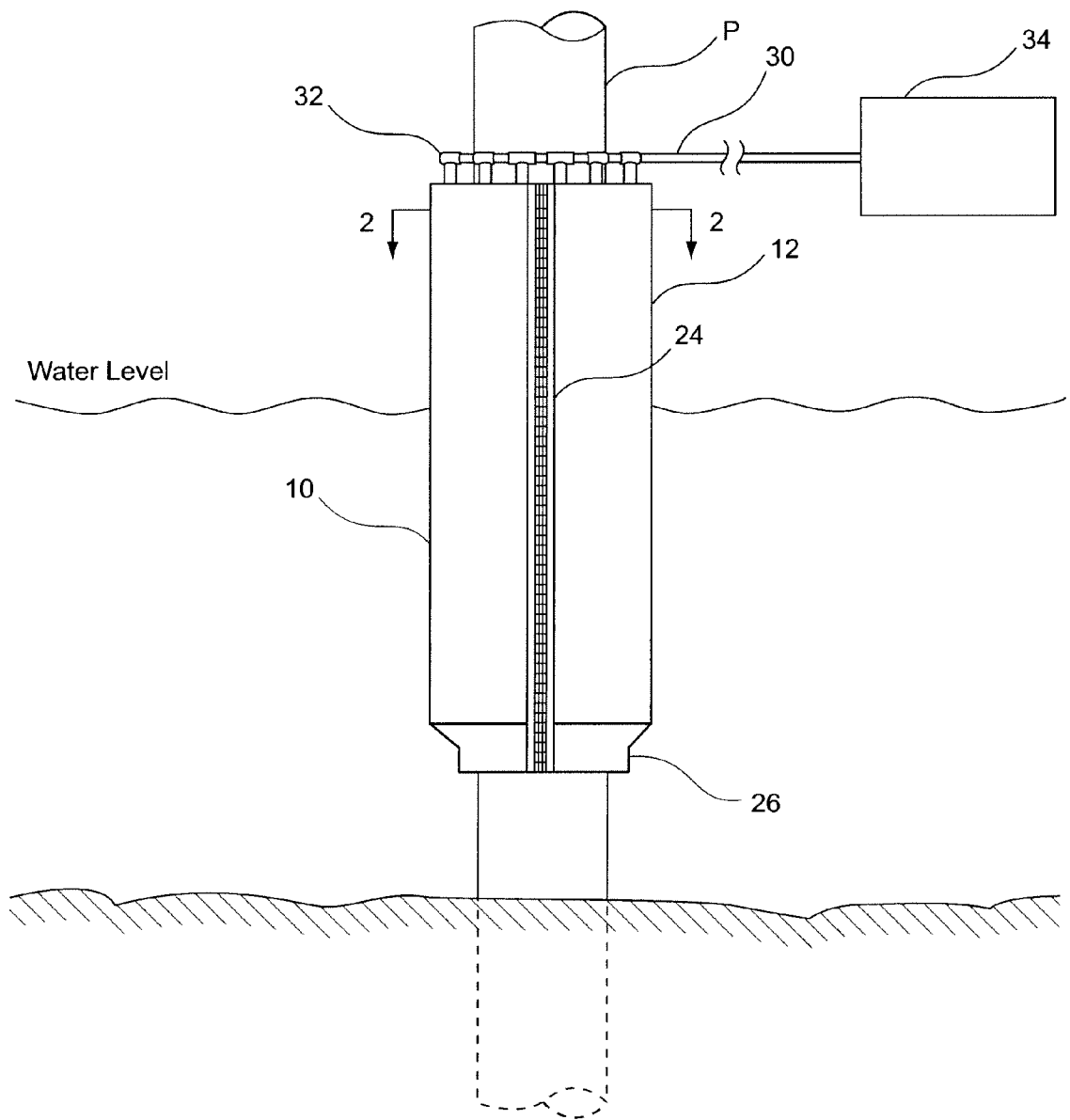
FIG. 1 is an elevational view of a sleeve according to a first embodiment. The sleeve is shown installed on a pile to be driven.

The present invention relates to a sound attenuation sleeve for use on a piling during underwater construction. The sound attenuation sleeve is made of at least two layers of fabric; one or both of (i) at least one hose, and optionally a plurality of hoses, positioned between the at least two layers of fabric, and (ii) a plurality of hollow, gas-filled structures positioned between the at least two layers of fabric; and first and second connectors secured to the at least two layers of fabric such that upon wrapping the sleeve about a piling, the first and second connectors are positioned for mating engagement.

The fabric used to form the sound attenuation sleeve is preferably a reasonably flexible fabric that allows the device to be wrapped about a piling. The two layers of fabric can be composed of the same fabric or different fabrics, and the fabrics can be woven or non-woven.

Preferred flexible fabric materials are geosynthetic fabrics. Geosynthetic fabrics are formed of polymeric materials and can be either woven or non-woven. The geosynthetic fabric is "water-pervious" or permeable to water, meaning that water passes through the fabric and is not absorbed by the fabric.

Useful geosynthetic fabrics are further characterized by high load distribution capacity. Geosynthetic fabrics are commercially available in a range of tensile strengths, permeabilities, and permitivities, and are useful for the purposes of the invention throughout those ranges.

The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, Propex® 4508 and 4516 and AMO-PAVE polypropylene fabrics available from Propex Fabrics, Inc. (previously Amoco Filters and Fabrics Inc.) (Austell, Ga.); Geotex® nonwoven fabrics available from Propex, Inc. (Chattanooga, Tenn.); Typar®, a polypropylene fabric commercially available from Dupont; and TREVIRA® Spunbond, a polyester fabric commercially available from Hoechst Fibers Industries. Examples of suitable woven geosynthetic fabrics include, but are not limited to, Mirafi® Filterweave® woven geotextiles (Mirafi Construction Products, Pendergrass, Ga.), GTF series fabrics available from Linq Industrial Fabrics, Inc. (Summerville, S.C.); and Geotex® 2016 or 2044 available from Propex Fabrics, Inc.

The at least two layers of the fabric materials can be joined together by stitching or heat fusion. In certain embodiments, the sleeve can be provided with a multi-part inner layer (that contains two or more fabric materials) and/or a multi-part outer layer (that contains two or more fabric materials).

In certain embodiments, the sleeve can be provided with two or more elongate cells that are spaced along the length of the sleeve such that, upon wrapping the sleeve about the pile (to be driven) and connecting the first and second connectors, the cells are more or less aligned in a top to bottom fashion. These cells, if present, can be formed by connecting the layers of fabric material together by stitching or heat fusion or using temporary fasteners as zippers, grommets or other devices. Alternatively, the cells can be formed by a separate tube of fabric that is retained between the at least two layers that form the sleeve. The tubes, if employed, are preferably oriented in a vertical direction such that, upon installation of the sleeve on a pile, the tubes are substantially parallel to the pile.

The sleeve can include at least one hose or, optionally, a plurality of hoses. The one or more hoses can be positioned between the at least two layers of fabric. The one or more hoses are preferably collapsible and/or flexible. A preferred hose is a collapsible polyvinylchloride hose.

When more than one hose is employed, the hoses are preferably distributed evenly along the length of the device such that, upon wrapping the sleeve about the pile (to be driven) and connecting the first and second connectors, the hoses substantially surround the pile or are at least uniformly distributed around the circumference of the pile. When relying exclusively on the one or more hoses to attenuate sound transmission, the one or more hoses are preferably closely packed within the sleeve so that few, if any, gaps form between the hoses about the circumference of the file.

In certain embodiments, only a single hose can be used, particularly when the hose itself is not relied upon as the primary sound attenuating element of the sleeve.

Regardless of the embodiment, the one or more hoses are preferably coupled at their upper ends to a conduit that delivers compressed gas from a source of compressed gas. The conduit is preferably provided with a valve that can be used to purge gas from the system (i.e., after use, prior to removal of the sleeve from a driven pile). When delivery of compressed gas is halted and the valve is opened, the pressure of the water will force the air inside the hose(s) to escape from the system. This simplifies removal of the sleeve from a pile (and installation onto the next pile). A preferred conduit system is fabricated from flexible PVC piping.

The hoses can be coupled at their lower ends to one or more diffusers, which are used to emit the compressed gas to a region inside the layers of fabric that form the sleeve as well as optionally to a region external to the sleeve (which may include the region between the pile and the sleeve). The one or more diffusers can be any porous diffuser capable of emitting varied sizes of gas bubbles. The diffuser can also have any configuration that is adapted for fitting between the at least two layers of flexible fabric.

According to another approach, rather than simply carry compressed gas, the hoses can be used to confine a plurality of hollow structures of the type described below.

According to another approach, the at least two layers of fabric do not contain the hoses of the type described above, but instead contain a plurality of hollow structures of the type described below.

The hollow (i.e., gas-filled) structures can have any geometric shape, but preferably they are spherical. A plurality of different sizes can be used so that they can be packed inside the hose. The hollow structures are preferably formed of a thermoplastic material (e.g., polyethylene, polypropylene, etc.). The hollow structures, when employed, should be sufficiently durable (i.e., rigid) to withstand operating at pressures approaching water depths of about 100 to 125 feet, or even up to 150 feet or more. In this embodiment, the hollow structures also can be retained within a separate tube of fabric material in much the same manner as described above. Suitable hollow structures are commercially available from a number of vendors including, without limitation, McMaster-Carr (Chicago, Ill.; Los Angeles, Calif.; Atlanta, Ga.) and Product Components Corporation (Martinez, Calif.).

The dimensions of the sleeve, and the at least two layers of fabric that are used to form the sleeve, can be selected based upon the dimensions of the plurality of hollow structures that are intended to be retained therebetween. According to one embodiment, a plurality of different sizes of hollow structures can be selected to maximize sound attenuation within the desired window (e.g., above 5 kHz, such as between 5-10 kHz). This is described in the examples.

According to a further approach, the sleeve primarily contains hollow, gas-filled structures, but also contains up to several conduits that are designed for delivery of compressed air via one or more coupled diffusers positioned at the bottom of the sleeve. The diffusers can release a traditional air bubble curtain within the at least two layers of fabric that form the sleeve or outside the at least two layers of fabric.

The sleeve can be constructed such that it is designed to wrap once around the pile, i.e., the length of the sleeve (when opened) is roughly that of the pile circumference, or the sleeve can be constructed to wrap around the pile more than once, i.e., overlapping itself. In the former arrangement, the mating connectors (described below) are typically positioned at the two ends of the sleeve so that they align for mating engagement when the sleeve is wrapped once around the pile. In the latter arrangement, one connector is located adjacent to one end of the sleeve and the other connector is located on an external surface of the sleeve such that the two connectors align for mating engagement upon wrapping the sleeve about the pile a desired number of times.

In addition, several separate sleeves of the invention can be used together in combination, i.e., wrapped around one another to form a multi-layered composite sleeve.

The first and second connectors can be any suitable connector. Preferably, the first and second connectors are zipper fasteners or complementary hook and loop components. Other fasteners can also be used. The fasteners also can be a series of fasteners that allow the sleeve to be disconnected in stages as the pile is driven into the floor of the body of water.

At the lower end of the sleeve, the fabric layers can be joined together to form a pocket. The pocket is designed to carry weights, such as a length chain or cable, or individual weights. The weights are intended to help maintain the lower end of the sleeve against the pile while submerged. This offsets the buoyancy of the hollow, gas-filled structures or the hoses (while gas is being delivered).

The invention will be further described in connection with several preferred embodiments.

Figure 2:
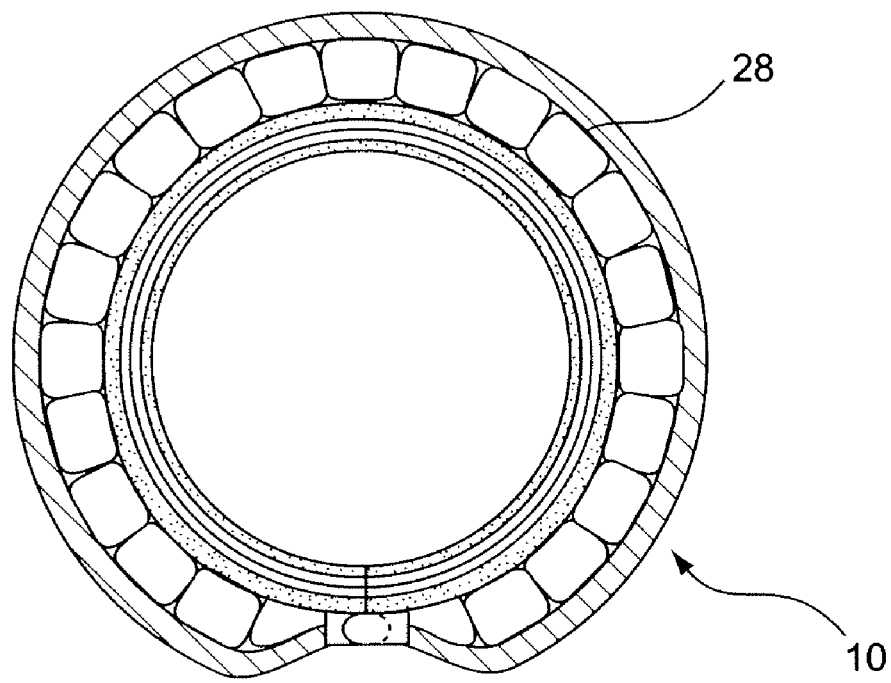
FIG. 2 is a cross-sectional view of the sleeve taken along line 2-2 of FIG. 1.
Figure 3:
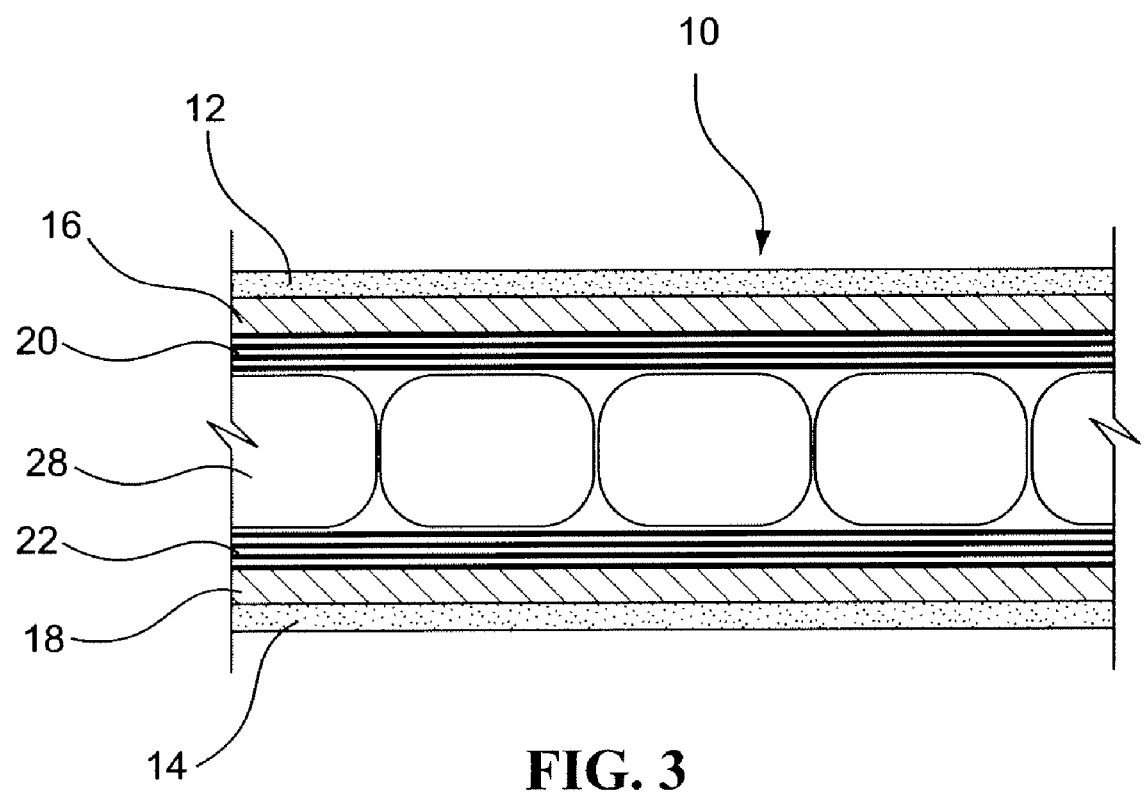
FIG. 3 is an enlarged, partial cross-sectional view of the sleeve shown in FIG. 1.

Referring to FIGS. 1-3, and particularly to FIG. 3, one embodiment of the sound attenuation sleeve 10 is shown installed on pile P. The at least two layers of fabric material include inner and outer layers 12, 14 of a woven geosynthetic fabric (e.g., Geotex® 2016 or 2044); secondary inner and outer layers 16, 18 of non-woven geosynthetic fabric (e.g., ProPex® 4516); and four inner and four outer layers 20, 22 of a geosynthetic mat (e.g., Pyramat® from SI Geosolutions). The collapsible hoses 28 (shown inflated) are sandwiched between the layers 20, 22. A zipper 24 is provided to connect the first and second edges of the sleeve, and a pocket 26 (containing one or more chains or other forms of weights) is provided at the lower edge of the sleeve. When a batter pile is being installed the pocket can include a flexible sleeve that conforms to the non perpendicular piling while providing a positive seal with the bed of the body of water in which the pile is being driven.

Each of the hoses 28 is connected to a gas injection system 30 that includes conduits 32 and a source of compressed gas 34 (e.g., an air compressor). A diffuser is optional in this embodiment.

Figure 4:
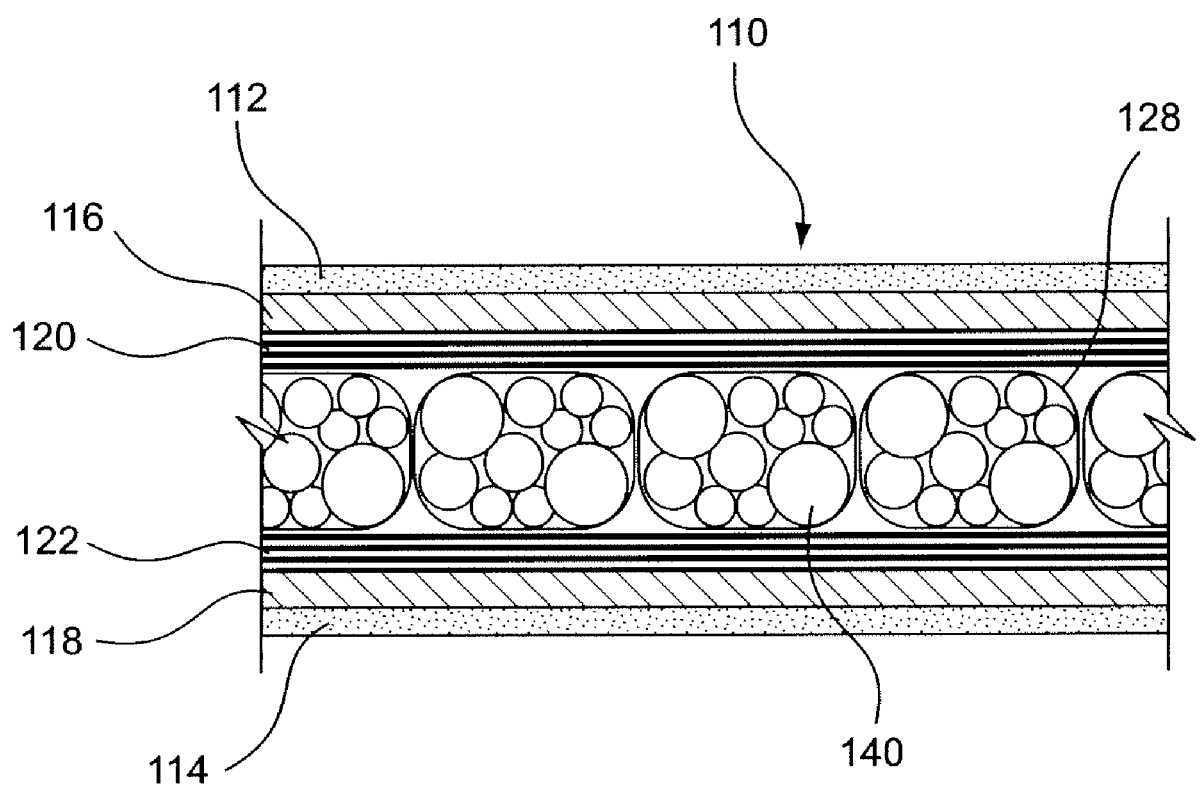
FIG. 4 is an enlarged, partial cross-sectional view of a sleeve according to a second embodiment of the invention. The overall construction of the sleeve is similar to that shown for the embodiment of FIG. 1, except for the additional features shown in FIG. 4.
Figure 5:
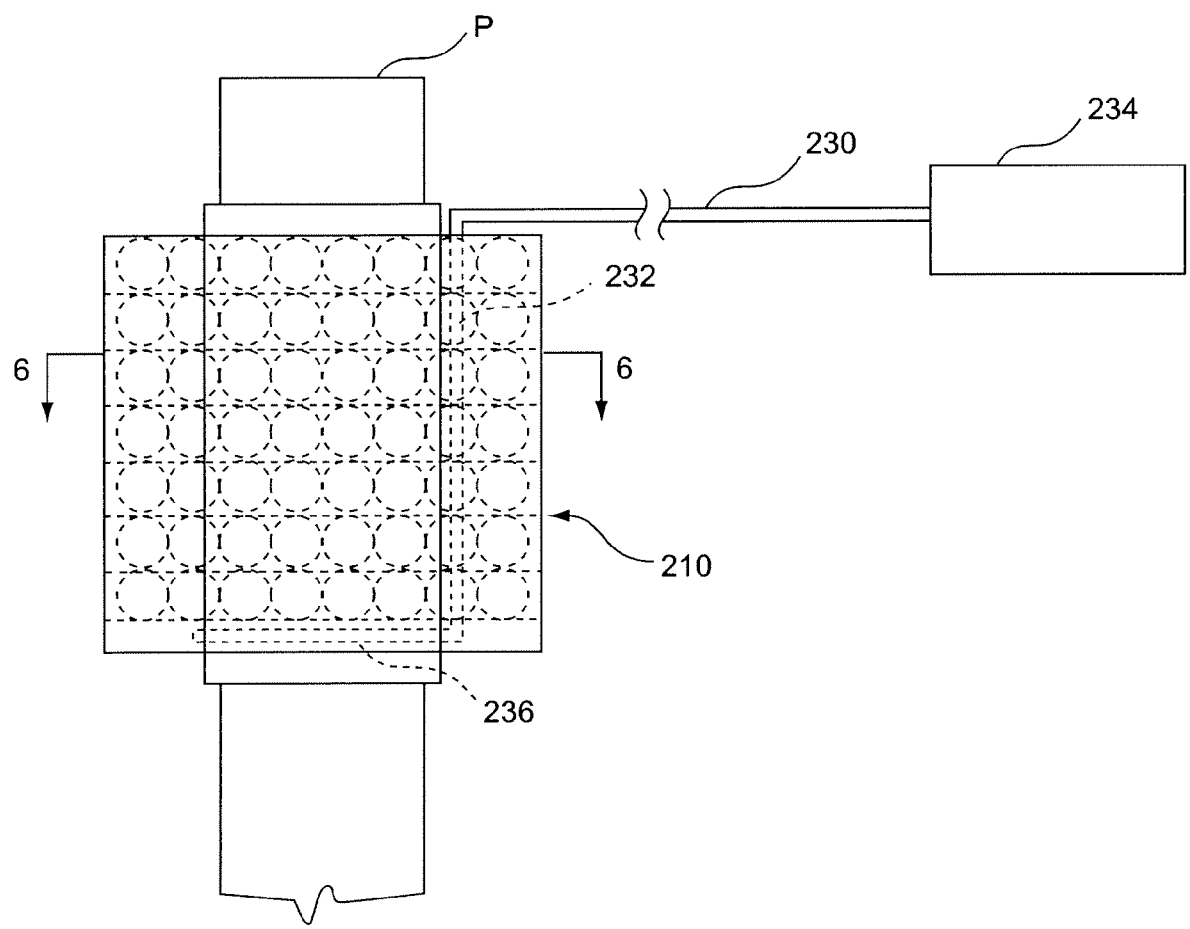
FIG. 5 is an elevational view of a sleeve according to a third embodiment. The sleeve shown is installed on a pile to be driven.
Figure 6:
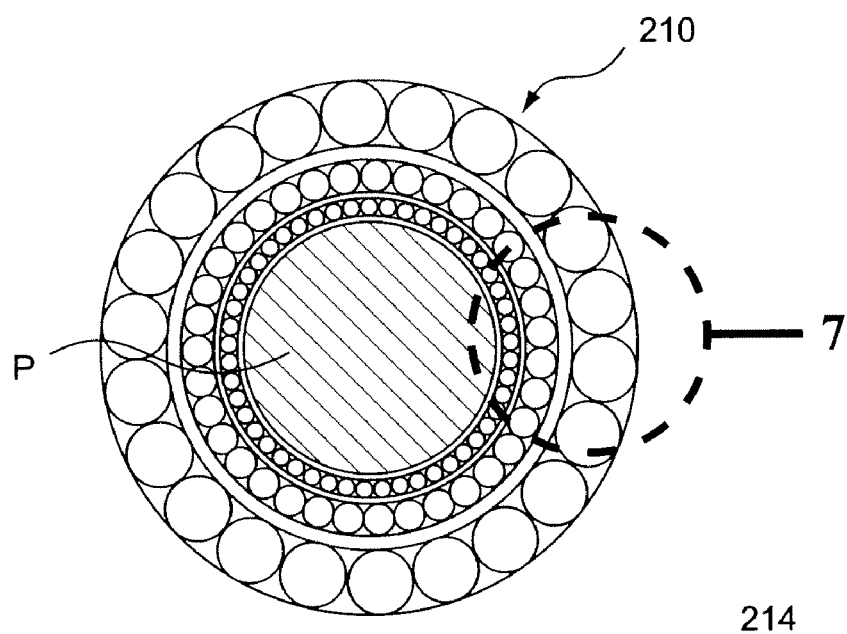
FIG. 6 is a cross-sectional view of the sleeve taken along line 6-6 of FIG. 5.
Figure 7:
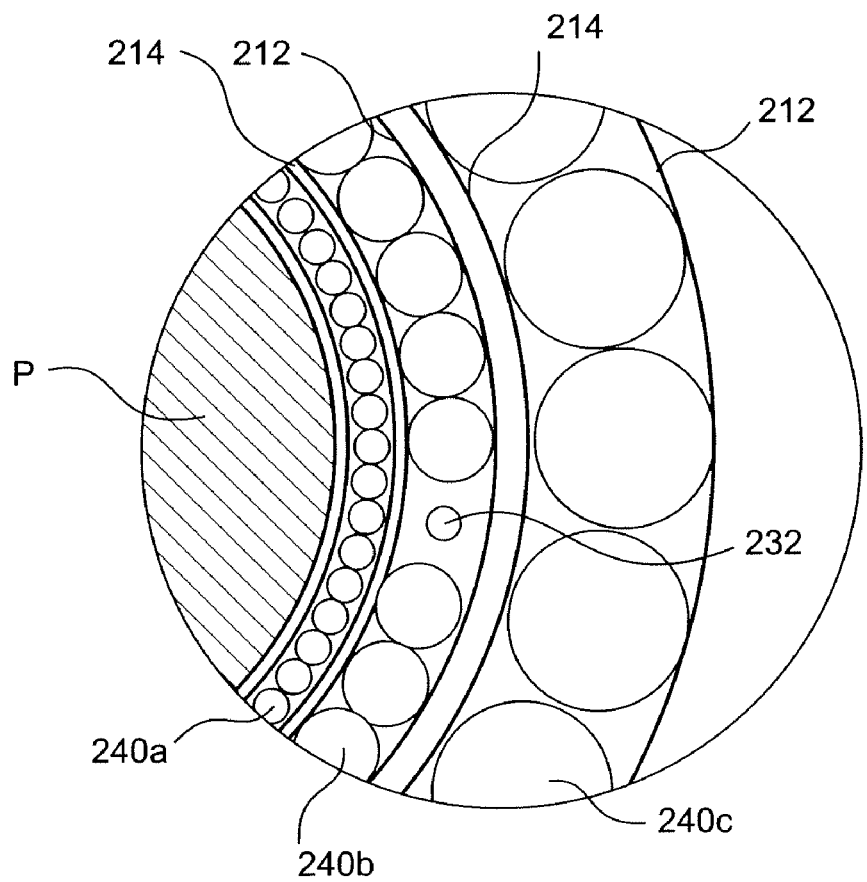
FIG. 7 is an enlarged, partial cross-sectional view of the sleeve shown in FIG. 6.

Referring to FIG. 4, a second embodiment of the sound attenuation sleeve 110 is shown. The overall construction of this embodiment is similar to that shown for sleeve 10 in FIGS. 1-3. The at least two layers of fabric material include inner and outer layers 112, 114 of a woven geosynthetic fabric (as described above); secondary inner and outer layers 116, 118 of non-woven geosynthetic fabric (also as described above); and four inner and outer layers of a geosynthetic mat (also as described above). The primary difference is that the hoses 128 are each filled with a plurality of hollow structures 140 that contain a gas (e.g., air). As shown, a plurality of different sized spherical structures is packed in each hose. The sleeve 110 also includes a zipper 124 to connect the first and second edges of the sleeve, and a pocket at the lower edge of the sleeve, both as shown in FIG. 1.

Referring to FIGS. 5-8, a third embodiment of the sound attenuation sleeve 210 is shown. The sleeve 210 is intended to wrap around the pile P several times (3 shown). The sleeve 210 is formed by an outer layer 212 containing fabric materials and an inner layer 214 containing fabric materials. Between the inner and outer layers 212, 214 is a layer that includes hollow structures 240 (described above) of varying sizes. Three sizes of these structures are shown: 240a (small), 240b (intermediate), and 240c (large). It should be appreciated that any number of different sizes can be employed depending on the frequencies that are intended to be attenuated. Although the structures can be positioned in any number of arrangements, structures 240a-c are arranged such that, upon installation about a pile (to be drive), the small structures 240a are present within the innermost wrapping of the sleeve, the intermediate structures 240b are present within the intermediate wrapping of the sleeve, and the large structures 240c are present within the outermost wrapping of the sleeve. A zipper connector or hook/loop connector (omitted from the figures for clarity) can be used to connect the one end of the sleeve to its mating connector which is secured externally to the outer layer as described above.

A gas injection system 230 is also provided, and includes a conduit 232 in communication between a source of compressed gas 234 and a diffuser 236.

Figure 8:
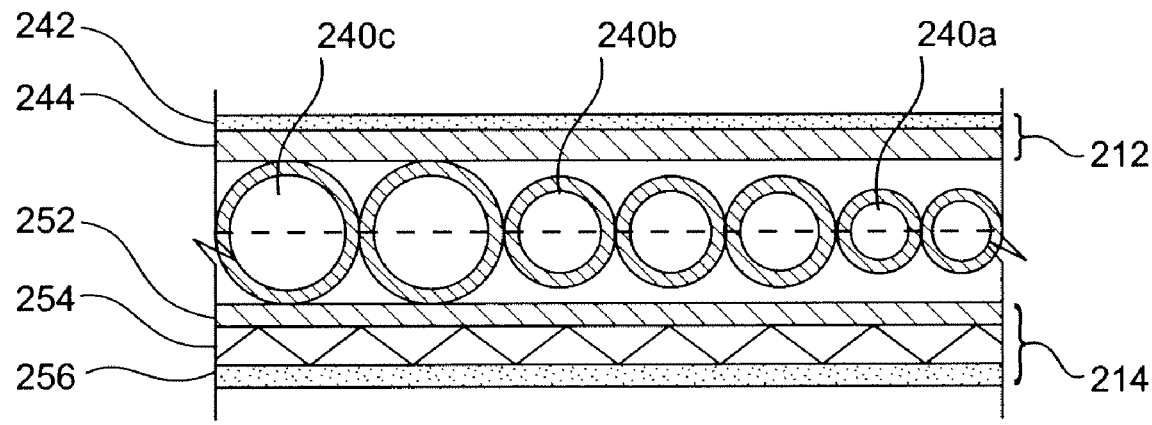
FIG. 8 is a cross-sectional view showing the fabric construction for a sleeve of the present invention.

As shown in FIG. 8, the outer layer 212 is preferably formed from two materials and the inner layer 214 is preferably formed of three materials. According to a preferred embodiment, the layer 242 is a woven geosynthetic fabric such as Geotex® 2044, the layer 244 is a nonwoven geosynthetic fabric such as ProPex® 4508, the layer 252 is a nonwoven geosynthetic fabric such as ProPex® 4508, the layer 254 is a stainless steel wire mesh, and layer 256 is a woven geosynthetic fabric such as Geotex® 2044. The hollow structures 240a-240c are positioned between layers 244 and 252.

Figure 9:
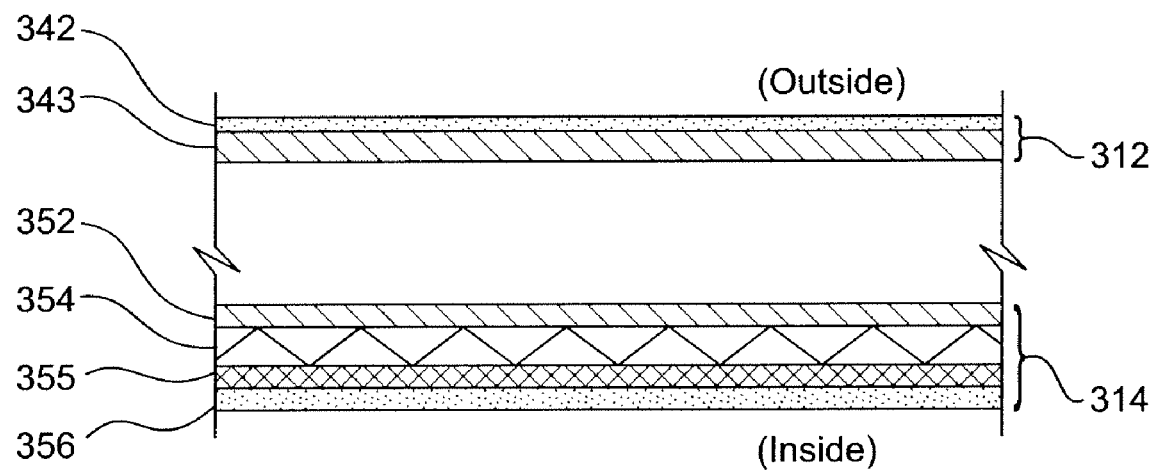
FIG. 9 is a cross-sectional view showing another fabric construction for a sleeve of the present invention.
Figure 10:
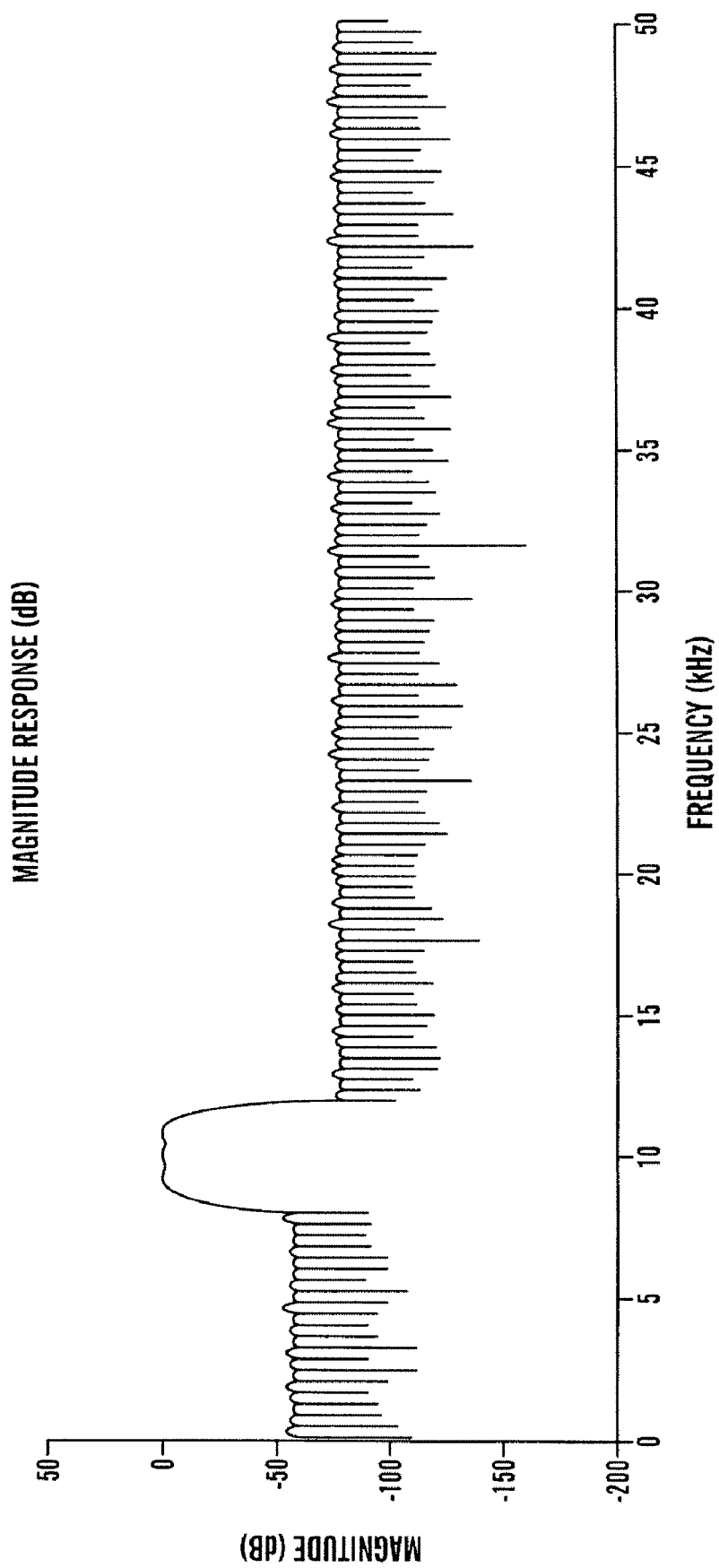
FIG. 10 is a plot of bandpass filter response as tested on a sleeve of the invention during a simulated acoustic analysis performed in an indoor tank setting. The filter is centered on 10 kHz with a 2 kHz band.

As shown in FIG. 9, the outer layer 312 is preferably formed from two materials and the inner layer 314 is preferably formed of four materials. According to a preferred embodiment, the layer 342 is a woven geosynthetic fabric such as Geotex® 2044, the layer 343 is a nonwoven geosynthetic fabric such as ProPex® 4516, the layer 352 is a nonwoven geosynthetic fabric such as ProPex® 4516, the layer 354 is a stainless steel wire mesh, the layer 355 is a nonwoven geosynthetic fabric such as ProPex® 4508, and layer 356 is a woven geosynthetic fabric such as Geotex® 2044. The hollow structures (omitted from the figure) are positioned between layers 343 and 352.

In the above embodiments, the stainless steel mesh can vary with the size of the pile being driven. That is, sleeves intended for smaller piles can include a smaller gauge mesh as compared to sleeves intended for use on larger piles. The stainless steel mesh, as a part of the sleeve, is intended to protect the sound attenuating components—the hollow structures and/or gas injection system—from the forces generated during the pile driving operation. As indicated in FIGS. 8 and 9, the stainless steel mesh should installed as part of the inside layer (closest to the pile being driven).

In use, a sound attenuation sleeve of the present invention will be installed onto a pile to be driven. Basically, the sleeve is wrapped around the pile, and the first and second connectors matingly engaged so that the sleeve wraps (encircles) the pile. According to the first embodiment, compressed gas is delivered through the conduit and hoses before beginning pile driving operations. Compressed gas should be delivered during the entirety of the pile driving operation. According to the second and third embodiments, driving operations can begin once the sleeve is installed and the pile positioned. Delivery of compressed gas is optional.

With the first embodiment, the gas bubbles released from the diffuser in combination with the gas within the hoses will attenuate sound or shock waves caused by the pile driving operation. Gas bubbles released from the diffuser will travel upwardly, some passing through the fabric (allowing gas bubbles to travel upwardly outside of the sleeve and internally of the sleeve). Depending on the fabric materials used to form the inner and outer portions of the sleeve, the release of gas bubbles externally and/or internally can be controlled.

Upon cessation of driving operations, the flow of compressed gas can be halted and the valve opened to release gas from the hoses. Thereafter, the sleeve can be either slipped off of the piling from above (using a crane) and later the connectors can be uncoupled to allow for installation upon another piling. Alternatively, the connectors can be disengaged by a diver, and the sleeve removed from the water. A further option is to open the connectors in stages (as the pile is driven into the floor of the body of water), with the sleeve being partially removed during pile driving operations.

With the second and third embodiments, the presence of hollow structures of varying sizes will attenuate sound or shock waves caused by the pile driving operations. In particular, the size of the hollow structures can be matched to the frequencies of the pile driving operations such that the "air bubbles" that exist within the plurality of hollow structures optimally reduce sound or shock wave transmission. Upon cessation of the driving operation, the sleeve can be removed using either of the approaches identified in the preceding paragraph.

In these latter embodiments, gas can also be delivered via the gas injection systems and via the diffuser. Under these circumstances, driving operations can occur while the gas is being delivered or, optionally, when no gas is being delivered.

EXAMPLES

The Examples set forth below are for illustrative purposes only and are not intended to limit, in any way, the scope of the present invention.

Example 1

Testing of Hollow Plastic Spheres for Use in Sound Attenuation Sleeve

Hollow plastic spheres with diameters of approximately 1.5 inches (~38.1 mm), 2.75 inches (~69.9 mm), and 4.5 inches (~114.3 mm) were selected for use in the sound attenuation sleeve based on the following data and analysis of the plastic spheres' ability to withstand pressure or collapse strength. These plastic spheres were as provided by McMaster-Carr and Product Components Corp.

To initially select which spheres were to be tested for collapse strength, the optimal diameter to attenuate sound at specific frequencies was estimated and their ability to reflect sound from the surface of the hollow plastic spheres. Maximum sound attenuation will occur when the interfering medium has a dimension approximately equal to multiples of ½ the wavelength of the sound generated. At dimensions of ¼ wavelengths of the sound, amplification can occur. This is analogous to the air gap to nullify the sound.

To address each wavelength of sound frequency, various sizes of air bubbles would be required. If a single void is supplied filled with air, the size of the void to cancel sound at the various frequencies would have to be extremely large. A representation of various sized bubbles required to cancel out sound at several frequencies, in both fresh and sea water, is shown in Table 1 below.

TABLE 1

Bubble Sizes for Disruption of Representative Frequencies

| Hertz (cps) | Salt Water Bubble (in) | Fresh Water Bubble (in) |
|---|---|---|
| 50 | 599.21 | 583.46 |
| 250 | 299.61 | 291.73 |
| 500 | 59.92 | 58.35 |
| 1000 | 29.96 | 29.17 |
| 5000 | 5.99 | 5.83 |
| 10000 | 3.00 | 2.92 |

Based upon the above information, the sound attenuation sleeve should be sized to allow for bubbles of at least about 6 inches (~152.4 mm), which should allow the sleeve to attenuate frequencies greater than about 5000 Hz effectively. Based upon the varying size of bubbles needed, the sound attenuation sleeve should not be completely filled with air, but instead filled with several different sizes of hollow spheres Collapse strength tests were performed to simulate pressure corresponding to water depth, which measured the ability of the plastic spheres to withstand such pressure. The test was performed over a range from about 2 psi (~0.14 kg/cm$^2$), corresponding to 5 ft water depth, to over 95 psi (~6.68 kg/cm$^2$), corresponding to over 150 ft of water depth. The test was conducted in a compression chamber having a clear lid, which allowed the operator to observe the response of the plastic spheres to the applied pressure. The compression chamber was connected to a pressure gauge, which allowed for monitoring of the exact pressure at the time of sphere collapse. The collapse pressure, if any, was recorded for each sphere tested. The results of the test are shown in Table 2 below.

TABLE 2

Collapse Pressure of Tested Spheres

| Sphere Diameter (in) | Collapse (psi) | Wall Thickness (in.) |
|---|---|---|
| 1.5 | >95 | 0.038 |
| 2.75 | 95 | 0.035 |
| 4.5 | 72 | 0.100 |

Based on the results presented in Table 2, it was determined that each of the spheres was capable of withstanding water pressures under most pile driving operations at depths of about 130 feet or less. The smaller spheres should be able to withstand even greater depths.

Example 2

Construction and Testing of Sound Attenuation Sleeve for Attenuation of 10 kHz Frequency Based on the test results in Example 1, hollow plastic spheres with diameters of 1.5 inches (~38.1 mm), 3 inches (~76.2 mm), and 6 inches (~152 mm) (all from McMaster-Carr) were selected for use in the sound attenuation sleeve. The sizes used in the fabricated sound attenuation sleeve were slightly different from those tested in Example 1, primarily because of availability and a desire to attenuate lower frequencies as shown in Table 1.

The sound attenuation sleeve was constructed according to the embodiment illustrated in FIGS. 5-8.

A simulation of high frequency sound generation was performed to assess the ability of the sound attenuation sleeve to attenuate transmission at 10 kHz. Testing was performed at the Chase Ocean Engineering Lab at the University of New Hampshire using their large tank (12.2 m×18.3 m×6 m depth). This tank afforded the spatial characteristics required to accommodate testing at the 10 kHz signal. In the tank, the sound attenuation sleeve was submerged to a depth of 3 m, the acoustic source was suspended in the middle of the sound attenuation sleeve, and the hydrophones were then deployed. A single hydrophone (H1) initially was deployed 1.16 m from the source and suspended from the center of the cross-tank carriage at a depth of 3 m. A second hydrophone (H2) was later suspended from the cross-tank carriage at a different location, 90° relative to H1 and at a range of 3.21 m from the acoustic source. This hardware was deployed with the sound attenuation sleeve to acquire data that would allow the determination of attenuation at 10 kHz.

The specific hardware/software used during the insertion loss (IL) measurement included the Phillips-Fluke pm 5138 function generator as the signal generator, Peavy IPA300T amplifier as the power amplifier, Lubell Labs 9162 Underwater loudspeaker/ITC 1042 as the acoustic source, Reson 4014 hydrophone with pre-amplifier as the hydrophone, Reson VP2000 Filter/Amplifier and EC 6073 interface module as the amplifier (receive)/filter, National Instruments NI 5102 DAQ A/D Board 8 bits, 20 M Samples/sec max sample rate as the A/D, and Sony Vaio PC running NI SCOPE software as the data acquisition computer. The basic signal used for the 10 kHz experiment was a pulse that contained 15 cycles at 10 kHz or 1.5 ms in duration with 5 V peak-to-peak amplitude. These parameters were set on the Phillips-Fluke function generator. Prior to installing the sound attenuation sleeve, a series of acoustic measurements were made to validate the performance of the acoustic hardware. These results indicated that the hydrophones were performing according to the manufacturer's specification, and that a known source level (SL) was easily reproducible.

The results presented here include the insertion loss from the sound attenuation sleeve as it was evaluated under two operating conditions. The first condition was without an air injection system operating; this was the primary operating condition. The second was with the air injection system operating to inject air between the layers of the sound attenuation sleeve.

Given the two hydrophones and their positioning as described above, the IL results were acquired from two different ranges along two different radial lines away from the center of the sound attenuation sleeve. The results of the 10 kHz testing are displayed in Table 3 below. Basically, the received acoustic pressures were averaged, and then this result was used to determine the average IL. This is necessitated by the logarithmic nature of the dB scale.

TABLE 3

Summary of the 10 kHz Results

| TL1 | TL2 | G | SPL1 | SPL2 | IL1 | IL2 |
|---|---|---|---|---|---|---|
| (dB re 1 m) | | (dB) | (dB re 1 μPa) | | (dB) | |
| 1.3 | — | 20 | 135.6 | — | 37.1 | — |
| 1.3 | — | 20 | 136.8 | — | 35.9 | — |
| 1.3 | 10.1 | 20 | 126.9 | 121.6 | 45.8 | 42.3 |
| 1.3 | 10.1 | 20 | 126.8 | 121.8 | 45.9 | 42.3 |
| 1.3 | 10.1 | 20 | 126.4 | 121.3 | 46.3 | 42.6 |
| — | 10.1 | 10 | — | 120.5 | — | 43.3 |
| — | 10.1 | 10 | — | 118.1 | — | 45.8 |
| — | 10.1 | 20 | — | 116.0 | — | 47.8 |
| — | 10.1 | 20 | — | 117.8 | — | 46.1 |
| — | 10.1 | 30 | — | 113.5 | — | 50.4 |
| — | 10.1 | 30 | — | 114.9 | — | 49.0 |
| — | 10.1 | 40 | — | 114.0 | — | 49.9 |
| — | 10.1 | 40 | — | 117.6 | — | 46.3 |
| Averages | | | | | 43.3 | 46.4 |

IL results were achieved with the equation: SL − TL − SPL = IL, where SL = 174 (dB re 1 μPa @ 1 meter) for all measurements.

There was one signal recorded when the sound attenuation sleeve had air bubbling through it. This situation resulted in the lowest value of IL of 35.9. This recorded signal was representative of all those observed. The remaining signals in Table 3 indicate some variation of IL, especially at hydrophone 2, 3.21 meters from the sound attenuation sleeve. It was noted during the measurements that the sound attenuation sleeve would rotate occasionally, observed to be small (5"-10"), but not measured. The on-axis direction of the sound attenuation sleeve was always aimed at the hydrophone location and maintained by a tag line marking the location of the Lubell source in the sound attenuation sleeve, but it is possible that the small rotation combined with the angle between the two hydrophones (~20") could attribute to the 2-3 dB difference in the results as measured by the two hydrophones.

The manner in which the sound attenuation sleeve was assembled could result in some more opportune pathways for the sound compared to others. The IL results determined at hydrophone 2 were always greater than 42 dB. The escaping air bubbles may have helped to create opportunities for the sound to escape by 'moving' components in the sound attenuation sleeve. The directionality of the sound attenuation sleeve was not determined for this experiment.

The observed signals were low level (mv) signals. Their detection was based on knowing the distance from the sound attenuation sleeve to the hydrophones. An average sound speed for the tank water (1485 m/s) was used to estimate the time for the signal to travel from the source to the hydrophones. This established an initial estimate of arrival time of the signal. This point in time was adjusted forward and backward in time and different segments of the signal were investigated to determine the $V_{rms}$ and subsequently the SPL.

This segment of the signal was subjected to digital filter analysis with MATLAB. The filter was designed to pass 10 kHz band from 9-11 kHz, and the recorded measurements are illustrated in FIG. 12. The result was a clear indication that the segment of signal selected was correct. The signals were recorded after being filtered with a low-pass filter, and before digitizing. The VP 2000 had discrete filter settings, and the closest setting for use in these experiments was 15 kHz. All the data were recorded with a sampling frequency of 100 kHz. This rate and the setting of the low-pass filter ensured that the Nyquist condition was more than satisfied for these data.

The tested device was effective at attenuating sound at 10 kHz with an IL of approximately 40+ dB. The ability of the device to be effective at other lower frequencies cannot be quantitatively assessed from the above data; however, it is believed that the device will be effective at reducing transmission of desired frequencies based on the selection of hollow plastic spheres (see Example 1). Testing at lower frequencies can be performed in a deeper tank or in open water conditions.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A sound attenuation sleeve for use on a piling during underwater construction comprising:
    at least two layers of fabric joined together;
    at least one hose positioned between the at least two layers of fabric; and
    first and second connectors secured to the at least two layers of fabric such that upon wrapping the sleeve about a piling, the first and second connectors are positioned for mating engagement.

2. The sound attenuation sleeve according to claim 1, wherein said fabric is a geosynthetic fabric.

3. The sound attenuation sleeve according to claim 1, wherein said at least two layers of fabric are comprised of the same fabric.

4. The sound attenuation sleeve according to claim 1, wherein said at least two layers of fabric are comprised of different fabrics.

5. The sound attenuation sleeve according to claim 1, wherein said at least two layers comprises at least two layers of a woven geosynthetic fabric and at least two layers of a non-woven geosynthetic fabric.

6. The sound attenuation sleeve according to claim 5, wherein one layer of woven geosynthetic fabric and one layer of non-woven geosynthetic fabric form a first side of the sleeve, and the other layer of woven geosynthetic fabric and the other layer of non-woven geosynthetic fabric form a second side of the sleeve, the first side further comprising a stainless steel mesh positioned intermediate the one layer of woven geosynthetic fabric and the one layer of non-woven geosynthetic fabric.

7. The sound attenuation sleeve according to claim 1, wherein said at least one hose is collapsible.

8. The sound attenuation sleeve according to claim 1, wherein said at least one hose is flexible.

9. The sound attenuation sleeve according to claim 1, further comprising a diffuser coupled to each of said at least one hose.

10. The sound attenuation sleeve according to claim 1 further comprising a conduit coupled in fluid communication with each of said at least one hose.

11. The sound attenuation sleeve according to claim 10 further comprising an air valve connected to the conduit.

12. The sound attenuation sleeve according to claim 1, wherein said first and second connectors comprise complementary zipper fasteners.

13. The sound attenuation sleeve according to claim 1, wherein said first and second connectors comprise complementary hook and loop fasteners.

14. The sound attenuation sleeve according to claim 1, further comprising a source of compressed gas coupled in fluid communication with each of said at least one hose.

15. The sound attenuation sleeve according to claim 14, wherein said source of compressed gas is an air compressor.

16. The sound attenuation sleeve according to claim 1, wherein the at least two layers of fabric are joined together along a lower edge, forming a pocket, said sound attenuation sleeve further comprising a weight positioned in the pocket.

17. The sound attenuation sleeve according to claim 1 further comprising a plurality of hollow structures positioned between the at least two layers of fabric, each of the hollow structures being filled with a gas.

18. The sound attenuation sleeve according to claim 17, wherein the hollow structures are spherical.

19. The sound attenuation sleeve according to claim 17, wherein the hollow structures are differently sized.

20. A sound attenuation sleeve for use on a piling during underwater construction comprising:
    at least two layers of fabric joined together along first and second edges;
    a plurality of hollow structures positioned between the at least two layers of fabric, each of the hollow structures being filled with a gas; and
    first and second connectors secured to the at least two layers of fabric such that upon wrapping the sleeve about a piling, the first and second connectors are positioned for mating engagement.

21. The sound attenuation sleeve according to claim 20, wherein the hollow structures are spherical.

22. The sound attenuation sleeve according to claim 20, wherein the hollow structures are differently sized.

23. A method of attenuating underwater transmission of sound and/or shock waves during underwater pile driving operations comprising:
    surrounding a pile to be driven with a sleeve according to claim 14, wherein said first and second connectors are matingly engaged;
    introducing a compressed gas into the at least one hose; and driving the underwater pile during said introducing, whereby gas present within the at least one hose, and optionally released from the at least one hose, attenuates sound and/or shock waves produced during said driving.

24. A method of attenuating underwater transmission of sound and/or shock waves during underwater pile driving operations comprising:
- surrounding a pile to be driven with a sleeve according to claim 17, wherein said first and second connectors are matingly engaged; and
- introducing a compressed gas into the at least one hose; and
- driving the underwater pile during said introducing, whereby gas present within the hollow structures and present within the at least one hose, and optionally released from the at least one hose, attenuates sound and/or shock waves produced during said driving.

25. A method of attenuating underwater transmission of sound and/or shock waves during underwater pile driving operations comprising:
- surrounding a pile to be driven with a sleeve according to claim 20, wherein said first and second connectors are matingly engaged;
- driving the underwater pile, whereby gas present within the hollow structures, attenuates sound and/or shock waves produced during said driving.

* * * * *